US006400478B1

(12) United States Patent
Cheng et al.

(10) Patent No.: US 6,400,478 B1
(45) Date of Patent: Jun. 4, 2002

(54) WAVELENGTH-DIVISION-MULTIPLEXED OPTICAL TRANSMISSION SYSTEM WITH EXPANDED BIDIRECTIONAL TRANSMISSION CAPACITY OVER A SINGLE FIBER

(75) Inventors: Xin Cheng, San Diego; Shouhua Huang, Huntington Beach, both of CA (US)

(73) Assignee: Sorrento Networks, Inc., Santa Monica, CA (US)

( * ) Notice: Subject to any disclaimer, the term of this patent is extended or adjusted under 35 U.S.C. 154(b) by 0 days.

(21) Appl. No.: 09/054,287

(22) Filed: Apr. 2, 1998

(51) Int. Cl.[7] ................................................. H04J 14/02
(52) U.S. Cl. ........................................ 359/124; 359/114
(58) Field of Search ................................ 359/114, 124, 359/133, 127

(56) References Cited

U.S. PATENT DOCUMENTS

| 3,933,454 A | 1/1976 | DeLuca ...................... 385/123 |
| 3,940,278 A | 2/1976 | Wolf ........................... 501/37 |
| 3,950,075 A | 4/1976 | Cook et al. .................... 385/93 |
| 3,960,531 A | 6/1976 | Kohanzadeh et al. ......... 65/407 |
| 3,982,151 A | 9/1976 | Ludovici et al. ............ 313/465 |
| 3,999,836 A | 12/1976 | Wolf ........................... 385/142 |
| 4,017,013 A | 4/1977 | Hawk et al. ................ 225/96.5 |
| 4,037,922 A | 7/1977 | Claypoole .................... 385/104 |
| 4,049,414 A | 9/1977 | Smith ........................... 65/407 |
| 4,072,400 A | 2/1978 | Claypoole et al. .......... 385/128 |
| 4,081,500 A | 3/1978 | Malcolm ....................... 264/9 |
| 4,083,625 A | 4/1978 | Hudson ........................ 385/43 |
| 4,088,386 A | 5/1978 | Hawk ........................... 385/59 |
| 4,100,008 A | 7/1978 | Claypoole .................... 156/180 |
| 4,102,561 A | 7/1978 | Hawk et al. ................... 385/59 |
| 4,105,284 A | 8/1978 | Olshansky .................. 385/127 |
| 4,125,388 A | 11/1978 | Powers ......................... 65/426 |
| 4,135,779 A | 1/1979 | Hudson ......................... 385/45 |
| 4,211,610 A | 7/1980 | McGowan ................... 202/177 |
| 4,280,827 A | 7/1981 | Murphy et al. ............... 65/485 |
| 4,328,018 A | 5/1982 | Siegfried ..................... 65/420 |
| 4,351,658 A | 9/1982 | Olshansky .................... 65/430 |
| 4,360,371 A | 11/1982 | Blankenship et al. ......... 65/403 |
| 4,385,802 A | 5/1983 | Blaszyk et al. ............. 385/127 |

(List continued on next page.)

FOREIGN PATENT DOCUMENTS

| DE | 363047 A1 | 7/1988 | |
| DE | 43 02 133 A1 | 1/1993 | ............ H04J/14/02 |
| EP | 0 44 348 A2 | 12/1990 | ............ H04J/14/02 |
| EP | 0 729 248 A2 | 4/1996 | |
| EP | 0 758 169 A2 | 2/1997 | |
| WO | WO 94/09400 | 4/1994 | |
| WO | WO 97/49248 | 12/1997 | ............ H04J/14/02 |
| WO | WO 98/05134 | 2/1998 | |
| WO | PCT/US99/00367 | 5/1999 | |

OTHER PUBLICATIONS

"Demonstration of In–Service Supervisory Repeaterless Bidirectional Wavelength–Division–Multiplexing Transmission System", Y.K. Chen, et al., IEEE Photonics Technology Letters, vol. 7, No. 9, Sep. 1995.
Copy of PCT Search Report for corresponding PCT Application No. WO 99/52232.

Primary Examiner—Kinfe-Michael Negash
(74) Attorney, Agent, or Firm—Fulbright & Jaworski L.L.P.

(57) ABSTRACT

The present invention provides an expandable and cost-effective high capacity optical communication system using wavelength-division-multiplexing, optical direction guide means and bidirectional transmission of data over an optical waveguide. The use of interleaved bidirectional data channels reduces the minimum spacing between data channels, permitting a greater number of channels over a single optical waveguide.

6 Claims, 5 Drawing Sheets

U.S. PATENT DOCUMENTS

| | | | |
|---|---|---|---|
| 4,395,270 A | 7/1983 | Blankenship et al. | 65/403 |
| 4,396,409 A | 8/1983 | Bailey et al. | 65/432 |
| 4,413,882 A | 11/1983 | Bailey et al. | 385/123 |
| 4,415,230 A | 11/1983 | Keck | 385/127 |
| 4,436,368 A | 3/1984 | Keck | 385/127 |
| 4,437,870 A | 3/1984 | Miller | 65/491 |
| 4,453,961 A | 6/1984 | Berkey | 65/419 |
| 4,478,489 A | 10/1984 | Blankenship et al. | 385/11 |
| 4,486,212 A | 12/1984 | Berkey | 65/421 |
| 4,494,968 A | 1/1985 | Bhagavatula et al. | 65/386 |
| 4,494,969 A | 1/1985 | Bhagavatula | 65/403 |
| 4,500,043 A | 2/1985 | Brown | 242/413.3 |
| 4,501,602 A | 2/1985 | Miller et al. | 65/320 |
| 4,514,205 A | 4/1985 | Darcangelo et al. | 65/491 |
| 4,528,009 A | 7/1985 | Sarkar | 65/403 |
| 4,531,959 A | 7/1985 | Kar et al. | 65/382 |
| 4,549,781 A | 10/1985 | Bhagavatula et al. | 385/126 |
| 4,561,871 A | 12/1985 | Berkey | 65/412 |
| 4,578,097 A | 3/1986 | Berkey | 65/403 |
| 4,592,619 A | 6/1986 | Weidel | 385/14 |
| 4,636,405 A | 1/1987 | Mensah et al. | 427/493 |
| 4,662,307 A | 5/1987 | Amos et al. | 118/501 |
| 4,671,938 A | 6/1987 | Cook | 422/57 |
| 4,692,615 A | 9/1987 | Mensah et al. | 356/73.1 |
| 4,704,151 A | 11/1987 | Keck | 65/402 |
| 4,715,679 A | 12/1987 | Bhagavatula | 385/127 |
| 4,718,929 A | 1/1988 | Power et al. | 65/388 |
| 4,750,802 A | 6/1988 | Bhagavatula | 385/33 |
| 4,751,441 A | 6/1988 | Lewis | 318/439 |
| 4,763,970 A | 8/1988 | Berkey | 385/72 |
| 4,831,315 A | 5/1989 | Hammond et al. | 318/567 |
| 4,857,884 A | 8/1989 | O'Malley et al. | 340/311.2 |
| 4,972,483 A | 11/1990 | Carey | 704/222 |
| 5,040,188 A | 8/1991 | Lang et al. | 372/96 |
| 5,105,292 A | 4/1992 | Le Roy et al. | 359/123 |
| 5,144,465 A | 9/1992 | Smith | 359/117 |
| 5,162,937 A | 11/1992 | Heidemann et al. | 359/124 |
| 5,176,728 A | 1/1993 | Fugate et al. | 65/472 |
| 5,224,183 A | 6/1993 | Dugan | 385/24 |
| 5,317,440 A * | 5/1994 | Hsu | 359/113 |
| 5,351,239 A | 9/1994 | Black et al. | 370/476 |
| 5,371,813 A | 12/1994 | Artigue | 385/24 |
| 5,477,224 A | 12/1995 | Sinnock | 342/5 |
| 5,483,277 A | 1/1996 | Granger | 725/120 |
| 5,486,489 A | 1/1996 | Goldstein et al. | 438/40 |
| 5,493,625 A | 2/1996 | Glance | |
| 5,497,260 A | 3/1996 | Jurek et al. | 359/130 |
| 5,497,264 A | 3/1996 | Bayart et al. | 359/337 |
| 5,497,385 A | 3/1996 | Schmuck | 372/6 |
| 5,500,755 A | 3/1996 | Sierens et al. | 359/161 |
| 5,502,586 A | 3/1996 | Ohnsorge | 359/117 |
| 5,504,609 A | 4/1996 | Alexander et al. | |
| 5,504,827 A | 4/1996 | Schimpe | 385/24 |
| 5,506,723 A | 4/1996 | Junginger | 359/341.3 |
| 5,509,952 A | 4/1996 | Moore et al. | 65/406 |
| 5,510,926 A | 4/1996 | Bayart et al. | 359/179 |
| 5,517,232 A | 5/1996 | Heidemann et al. | 725/98 |
| 5,521,752 A | 5/1996 | Heidemann et al. | 359/341.43 |
| 5,521,909 A | 5/1996 | Holloway et al. | 370/404 |
| 5,521,914 A | 5/1996 | Mavraganis et al. | 370/352 |
| 5,522,007 A | 5/1996 | Drouart et al. | 385/141 |
| 5,528,283 A | 6/1996 | Burton | 725/116 |
| 5,539,734 A | 7/1996 | Burwell et al. | 370/410 |
| 5,544,192 A | 8/1996 | Pfeiffer | 372/69 |
| 5,544,272 A | 8/1996 | Carratt et al. | 385/128 |
| 5,546,378 A | 8/1996 | Wirth et al. | 370/223 |
| 5,546,414 A | 8/1996 | Pfeiffer | 372/18 |
| 5,550,667 A | 8/1996 | Krimmel et al. | 359/180 |
| 5,555,338 A | 9/1996 | Haag et al. | 385/101 |
| 5,557,439 A | 9/1996 | Alexander et al. | 319/130 |
| 5,561,553 A | 10/1996 | Marcerou et al. | 359/341.3 |
| 5,563,876 A | 10/1996 | Duxbury et al. | 370/402 |
| 5,567,794 A | 10/1996 | Barraud et al. | 528/70 |
| 5,570,218 A | 10/1996 | Sotom | 359/117 |
| 5,572,347 A | 11/1996 | Burton et al. | 359/124 |
| 5,572,614 A | 11/1996 | Lucas, Jr. | 385/91 |
| 5,574,816 A | 11/1996 | Yang et al. | 385/109 |
| 5,576,874 A | 11/1996 | Czerwiec et al. | 359/123 |
| 5,590,233 A | 12/1996 | Carratt et al. | 385/100 |
| 5,594,576 A | 1/1997 | Sutherland et al. | 359/118 |
| 5,594,823 A | 1/1997 | Tardy et al. | 385/46 |
| 5,595,669 A | 1/1997 | Le Bris | 219/121.59 |
| 5,598,493 A | 1/1997 | Bonham, Jr. et al. | 385/33 |
| 5,598,498 A | 1/1997 | Comezzi | 385/114 |
| 5,600,473 A | 2/1997 | Huber | 359/179 |
| 5,612,805 A | 3/1997 | Fevrier et al. | 359/124 |
| 5,612,808 A | 3/1997 | Audouin et al. | 359/161 |
| 5,613,023 A | 3/1997 | Guillon et al. | 385/37 |
| 5,621,842 A | 4/1997 | Keller | 385/114 |
| 5,625,728 A | 4/1997 | Tardy et al. | 385/30 |
| 5,625,735 A | 4/1997 | Di Maggio et al. | 385/91 |
| 5,629,994 A | 5/1997 | Huber et al. | 385/24 |
| 5,633,973 A | 5/1997 | Vincent et al. | 385/135 |
| 5,636,308 A | 6/1997 | Personne et al. | 385/102 |
| 5,640,268 A | 6/1997 | Chesnoy | 359/341.33 |
| 5,647,884 A | 7/1997 | Overton et al. | 65/533 |
| 5,649,038 A | 7/1997 | Boniort et al. | 385/59 |
| 5,649,043 A | 7/1997 | Adams et al. | 385/110 |
| 5,650,231 A | 7/1997 | Barraud et al. | 428/391 |
| 5,652,808 A | 7/1997 | Duchet et al. | 385/7 |
| 5,655,040 A | 8/1997 | Chesnoy et al. | 385/37 |
| 5,661,553 A | 8/1997 | Auge et al. | 356/73.1 |
| 5,661,585 A | 8/1997 | Feldman et al. | 359/180 |
| 5,661,833 A | 8/1997 | Omati | 385/88 |
| 5,663,818 A | 9/1997 | Yamamoto et al. | 359/118 |
| 5,668,652 A | 9/1997 | Hashomoto et al. | 359/125 |
| 5,673,129 A | 9/1997 | Mizrahi | 359/124 |
| 5,673,352 A | 9/1997 | Bauer et al. | 385/114 |
| 5,682,454 A | 10/1997 | Gaillard | 250/227.14 |
| 5,684,297 A | 11/1997 | Tardy | 359/123 |
| 5,687,014 A | 11/1997 | Czerwiec et al. | 359/123 |
| 5,687,041 A | 11/1997 | Lee et al. | 360/96.6 |
| 5,689,607 A | 11/1997 | Vincent et al. | 385/136 |
| 5,784,184 A | 7/1998 | Alexander et al. | |
| 5,841,557 A | 11/1998 | Otsuka et al. | |
| 5,852,505 A | 12/1998 | Li | |
| 5,896,211 A | 4/1999 | Watanabe | |
| 5,940,196 A | 8/1999 | Piehler et al. | |
| 5,949,563 A | 9/1999 | Takada | |
| 5,953,139 A | 9/1999 | Nemecek et al. | |
| 5,999,290 A * | 12/1999 | Li | 359/127 |
| 6,040,931 A | 3/2000 | Miyazaki et al. | |
| 6,041,152 A | 3/2000 | Clark | |
| 6,091,538 A | 7/2000 | Takeda et al. | |
| 6,118,561 A | 9/2000 | Maki | |
| 6,212,310 B1 | 4/2001 | Waarts et al. | |

* cited by examiner

WAVELENGTH-DIVISION-MULTIPLEXED OPTICAL TRANSMISSION SYSTEM WITH EXPANDED BIDIRECTIONAL TRANSMISSION CAPACITY OVER A SINGLE FIBER

TECHNICAL FIELD OF THE INVENTION

The invention relates to dense wavelength division multiplexing DWDM) systems which transmit multi-channel information and can efficiently expand the transmission.

BACKGROUND OF THE INVENTION

Optical fiber communications systems are the backbone of communications networks and have been rapidly expanding in the past ten years. However, the data handling capacity of many existing systems is limited and inadequate to support many applications. Among known methods for increasing the data handling capacity of optical fibers are optical dense wavelength division multiplexing (DWDM), frequency division multiplexing (FDM), and time division multiplexing (TDM). In an FDM system, a particular subcarrier frequency is assigned to each signal source, and a complete signal is constructed by combining each subcarrier frequency. While this is a useful technique for transmitting multiplexed signals, its capacity is limited by the need for a high signal-to-noise ratio, requiring, higher power systems which in turn limits the number of data channels due to interference, cross talk and the nonlinearity of the optical waveguide media due to inadequate separation of the channels. In a TDM system, an electronic switch (multiplexing unit) picks up the signal on each input channel in order of channel by channel at the transmitting end. The multiplexed signal is transmitted through a medium (optical fiber) and distributed to related terminal equipment at the output of the system receiver. This is an efficient approach for transmitting the signal when the data rate is less than 2.5 Gb/s. Unfortunately it is a very expensive system when the data rate of transmitted signals is more than 3 Gb/s, due to the inherent inefficiency in electronic switching from channel to channel.

In a DWDM system, multiple optical signal channels are carried over a single optical fiber, each channel being assigned a particular optical wavelength. The information capacity carried by each channel is typically between 2.5 Gb/s and 10 Gb/s. It is an efficient and cost effective method for increasing the capacity of existing optical fiber communication systems. A bidirectional DWDM system operating independently of the signal data rate and format is commercially available from Osicom, the details of which are described in United States Letters patent application Ser. No. 09/004,984, which is hereby incorporated by reference which explicitly teaches a short distance DWDM optical transmission system without any amplification or regeneration. However, in the existing Osicom system, in accordance with the relevant ITU specifications, the channel spacing between adjacent channels that are be transmitted over a single optical fiber is 0.8 nano meters ("nm") and is dictated by the need to avoid cross talk and other forms of data corruption between adjacent channels; such a relatively wide channel spacing permits the combined wavelength multiplexed optical signal to be spit into its constituent single wavelength components and permits those single wavelength components to be combined into the combined wavelength multiplexed signal using relatively simple and inexpensive filter-based optical multiplexers and demultiplexers without any mechanism for re-shaping or otherwise processing the individual data pulses in accordance with any predetermined data rate and format.

What is needed is an optical communications system which can transmit data bidirectionally with a minimal spacing between channels (thus maximizing the number of transmission channels) at a minimal cost in terms of data loss, functionality and reliability, that is compatible with existing optical components, and that is preferably independent of the data rate and format.

SUMMARY OF THE INVENTION

In a first aspect, the present invention provides a bidirectional optical transmission system, for transmitting unidirectional signals over an optical waveguide, comprising a first transmitter for transmitting signals in a first direction, and a second transmitter for transmitting signals in the opposite direction, each transmitter comprising a plurality of wavelength converters, each converting a different one of the unidirectional signals into a modulated optical signal centered about a different respective optical wavelength, and a respective wavelength multiplexer coupled to the wavelength converters, for combining the individual signals into a combined signal; a first receiver for receiving signals from the first transmitter and a second receiver for-receiving signals from the second transmitter, each receiver comprising a wavelength demultiplexer for separating the combined signal into received optical signals, and optical receivers, each responsive to a different one of the optical signals and converting it back into its original form; and a first directional guide means for coupling the first transmitter and the second receiver to one end of the waveguide, and a second directional guide means for optically coupling the second transmitter and the first receiver to the other end of the waveguide, each optical directional guide means comprising an input port for receiving the combined signal from a wavelength multiplexer before the combined signal has been is transmitted over the waveguide, an output port for transmitting the other combined signal to the other wavelength demultiplexer after the other combined signal has been transmitted over said waveguide, and a bidirectional port for transmitting the combined signal to the optical wave guide and for receiving the other combined signal from the optical waive guide; wherein a first plurality of information-bearing signals are modulated, combined and transmitted from the first transmitter to the first receiver in a first direction and a second plurality of unidirectional signals are modulated, combined and transmitted from the second transmitter to the second receiver in a second direction, concurrently and bidirectionally over the same said optical waveguide, adjacent optical wavelengths of either combined signal have a predetermined first channel spacing providing a predetermined minimal amount of cross talk between two adjacent channels regardless of the direction of transmission of the individual optical signals, whereby each said combined optical signal is compatible with wavelength multiplexers and wavelength demultiplexers that are designed for said predetermined first channel spacing between adjacent channels; adjacent optical wavelengths transmitted over the optical waveguide have a predetermined second channel spacing substantially less than said first predetermined channel spacing, whereby the maximum transmission capacity of said system with only one said waveguide is greater than that possible with a waveguide having said predetermined first channel spacing between adjacent channels; and adjacent channels of said optical waveguide are not used for transmission in a same said direction.

In other aspects, the present invention provides at least some of the first individual wavelengths of the first combined signal may be interleaved with the second individual wavelengths of said second combined signal; substantially all of the first individual wavelengths of said first combined signal may be interleaved with the second individual wavelengths of said second combined signal; the optical directional guide means may be optical circulators that guide essentially all of each said combined signal to a respective intended destination port; the optical directional guide means may be polarizers circulators that guide essentially all of each said combined signal to a respective intended destination port; each said predetermined spacing is measured from the nominal center of one channel to the nominal center of an adjacent channel; the first predetermined spacing is twice said second predetermined spacing; the first predetermined spacing is 0.8 nm and said second predetermined spacing is 0.4; the plurality of wavelength converters further comprises a photo detector for directly converting an optical input signal into a respective electronic signal; an electronic signal amplifier, for amplifying said resulting electronic signal; a laser; and a laser driver for directly modulating the output of the laser according to said resulting electronic signal; wherein each said laser produces a modulated optical signal at a different said center wavelength; and the first and second plurality of individual modulated signals are modulated, combined and transmitted, without regard to data rate or format.

These and other features and advantages of this invention will become further apparent from the detailed description and accompanying figures that follow. In the figures and description, numerals indicate the various features of the invention, like numerals referring to like features throughout both the drawings and the description.

DETAILED DESCRIPTION OF THE INVENTION

Figure 1:
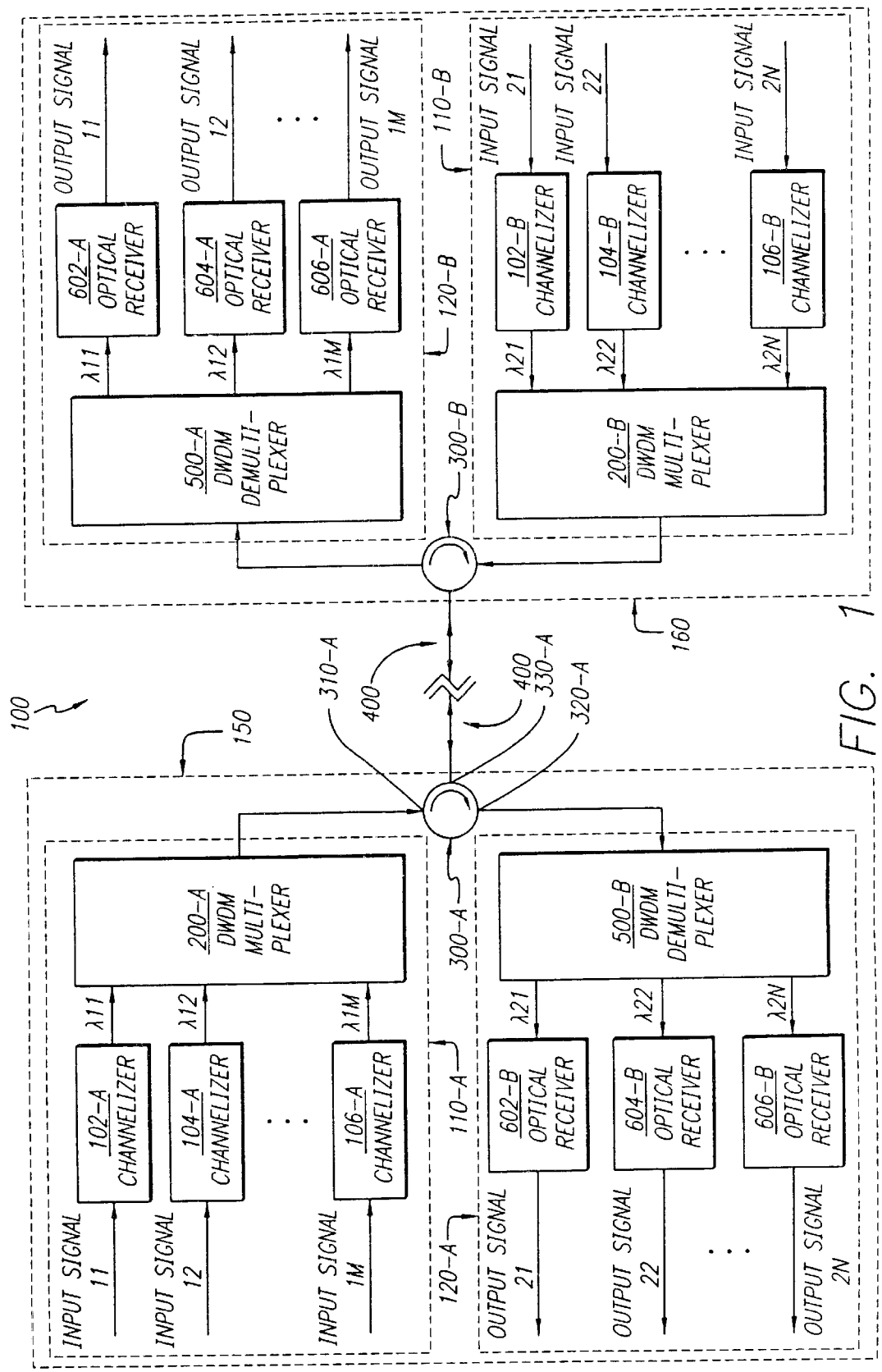
FIG. 1 schematically depicts a bidirectional communication system with a direction guide module.

FIG. 1 depicts a DWDM bidirectional optical communication system 100 constructed according to the present invention. The bidirectional optical communications system 100 includes two stations, a first station 150 and a second station 160, connected by an optical waveguide 400. The first station 150 has a transmitter 110-A for receiving information-bearing input signals, such as input signal 11, input signal 12, and input signal 1M, processing them (described below) and transmitting them across the optical waveguide 400 to the second station 160. The second station 160 has a receiver 120-B for processing and receiving said signals from the transmitter 110-A of the first station 150. The second station 160 also has a transmitter 110-B for receiving input signals, such as input signal 21, input signal 22, and input signal 2N, processing them (described below) and transmitting them across the optical waveguide 400 to the first station 150. The first station 150 also has a receiver 120-A for receiving and processing said signals from the transmitter 110-B of the second station 160. The transmitter 110-A and the receiver 120-A of the first station 150 need not be adjacent to each other, rather they merely need both be coupled in some manner to the same end of the optical waveguide 400. Similarly, the transmitter 110-B and the receiver 120-B of the second station 160 also need merely both be coupled in some manner to the same end of the optical waveguide 400 (i.e., the end opposite the one to which the first station 150 is coupled).

It should be understood that transmitter 110-A is substantially identical to transmitter 110-B, just as receiver 120-A is substantially identical to receiver 120-B. Having a transmitter and a receiver at each station is part of the bidirectional nature of the communications system 100. Thus for ease of description, transmitter 110-A and receiver 120-B will be initially discussed.

Transmitter 110-A can receive any number of input signals, such as input signals 11, 12, and 1M, which form the INPUT of the system. The input signals are information-bearing signals from some outside source, such as a telecommunication system, LAN, cable television system or other source, forwarded to the bidirectional optical communications system 100 of the present invention. Some input signals are electronic while others optical. The bidirectional optical communications system 100 of the present invention can accommodate a mixture of optical and electronic signals, as well as all of the signals being optical or electronic. Optical signals are typically generated by the user's terminal equipment, such as the SONET multiplexer, available from Alcatel, Lucent, Nortel, and NEC, or the FDDI network interface, available from Osicom. Electronic signals are generally produced by a digital tape player or camera, such as the devices available from Sony, Hitachi, and Philips, or by fast network hubs and switches, such as those available from 3Com, Cisco, and Osicom.

The transmitter 110-A also includes a plurality of WDM wavelength converters, such as channelizer 102-A, channelizer 104-A, and channelizer 106-A, each for receiving one electrical or optical input signal (i.e., input signals 11, 12, and 1M), and converting said signal to an individual modulated optical signal at a predetermined wavelength (said wavelengths are denoted as $\lambda_{11}$, $\lambda_{12}$, $\lambda_{1M}$, $\lambda_{21}$, $\lambda_{22}$, and $\lambda_{2N}$ in FIG. 1). Suitable wavelength converters can be obtained from vendors such as Lucent, Pirelli, and Ciena, while a preferred model is made by Osicom.

Transmitter 110-A further includes a DWDM multiplexer 200-A which combines the individual modulated optical signals from the various channelizers (102-A, 104-A, 106-A) into a single combined modulated optical signal. DWDM multiplexers are commercially available from a number of sources, such as Hitachi, JDS Fitel, Dicon Fiberoptics, and Kaifa Technology. The resulting combined signal is transferred to an optical direction guide means 300-A (discussed below), which transfers the signal to the optical waveguide 400 for transmission to the second station 160. The second station 160 includes an optical direction guide means 300-B substantially identical to the optical direction guide means 300-A of the first station 150. The optical direction guide means 300-B routes incoming combined signal to the receiver 120-B.

The receiver 120-B includes a DWDM demultiplexer 500-A, which is substantially identical in structure to the DWDM multiplexer 200-A of the transmitter 110-A. The DWDM multiplexer 200-A differs from the DWDM demultiplexer 500-A in that the while the DWDM multiplexer 200-A has multiple inputs (each for a different channelizer)

and only a single output (to the optical direction guide means 300-A), the DWDM demultiplexer 500-A has but a single input (from the optical direction guide means 300-B) and multiple outputs. A DWDM multiplexer 200-A can be substituted for a DWDM demultiplexer 500-A by simply reversing the inputs and outputs. The DWDM demultiplexer 500-A receives the incoming combined signal from the first station 150, separates out the optical signals from the various channelizers (102-A, 104-A, 106-A), and transfers each one of them to a respective optical receiver (602-A, 604-A, and 606-A), which will convert the optical signals back to their original form and format as information-bearing output signals (such as output signal 11, output signal 12, and output signal 1M). These output signals form the output of the system, and are transferred to appropriate receiving elements (not shown). The receiving elements are typically the end-user's equipment or/and testing instrument such as a receiving end of telecommunication system, LAN or cable television system, and SDH/SONET terminal / testing equipment, available from Alcatel, Lucent, Nortel, Tektronix, and NEC, or the FDDI network interface, available from 3Com, Cisco, and Osicom.

Thus an electronic or optical input signal 11 will be transferred to channelizer 102-A, which will convert input signal 11 to an optical signal at wavelength $\lambda_{11}$. The resulting individual modulated optical signal will be transferred to DWDM multiplexer 200-A, which will combine it with the resulting individual-signals from the other channelizers (for example, channelizer 104-A supplying input signal 12 at wavelength $\lambda_{12}$ and channelizer 106-A supplying input signal 1M at wavelength $\lambda_{1M}$). The resulting combined modulated optical signal is transferred to the optical direction guide means 300-A which in turn transfers it to the optical waveguide 400 for transmission to the second station 160. At the second station 160 the optical direction guide means 300-B directs said combined modulated optical signal to the DWDM demultiplexer 500-A which segregates the individual modulated optical signals from the individual channelizers, and passes each individual signal on to a respective optical receiver (such as optical receiver 602-A). Optical receivers convert the individual optical signal from a channelizer back into its original electronic or optical format. Optical receivers are commercially available from any number of sources, such as Hitachi, Lucent, and Mitsubishi. The resulting output signals (output signals 11, 12, and 1M) are transferred to a respective receiving element (not shown). Stated differently, optical receiver 602-A receives the individual signal (originally input signal 11) from channelizer 102-A at wavelength $\lambda_{11}$ and forms output signal 11, optical receiver 604-A receives the individual signal (originally input signal 12) from channelizer 104-A at wavelength $\lambda_{12}$ and forms output signal 12, and optical receiver 606-A receives the individual signal (originally input signal 1M) from channelizer 106-A at wavelength $\lambda_{1M}$ and forms output signal 1M.

Signals are transmitted from transmitter 110-B to receiver 120-A in the same manner described above, except in the opposite direction. Specifically, input signal 21 is processed by channelizer 102-B, and the resulting individual modulated optical signal at wavelength $\lambda_2$ is combined with other resulting individual signals (e.g., input signals 22 and 2N processed by channelizers 104-B and 106-B) and sent via optical direction guide means 300-B, optical waveguide 400, and optical direction guide means 300-A to DWDM demultiplexer 500-B, which segregates out said individual modulated optical signals and transfers each of them to a respective optical receiver (i.e., optical receiver 602-B, 604-B or 606-B), which reconverts them to their original form and format as output signals 21, 22 and 2N, respectively. As can be seen, signals travel bidirectionally simultaneously on a single optical waveguide 400.

Figure 2:
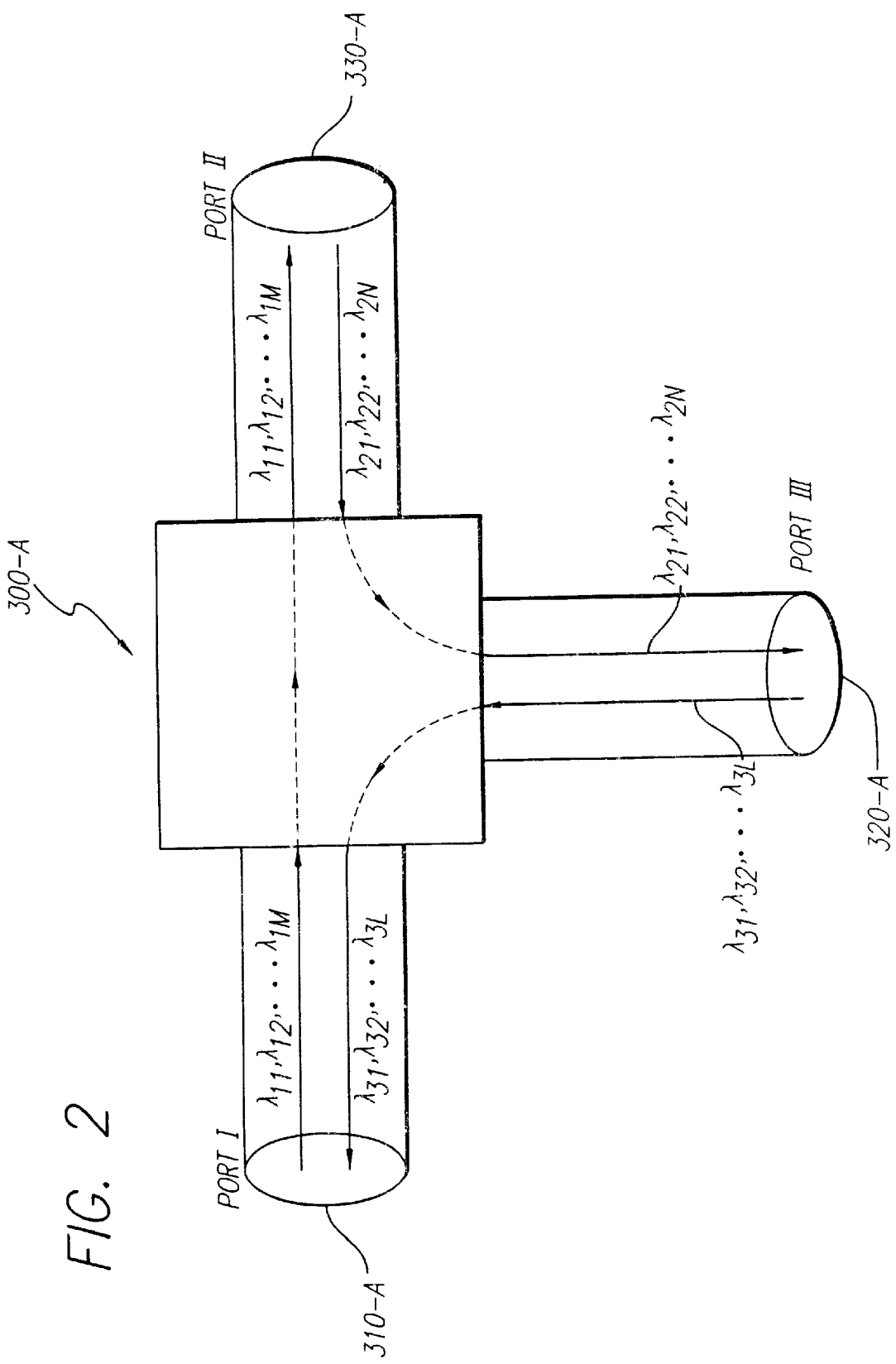
FIG. 2 schematically depicts the direction guide in FIG. 1.
Figure 3:
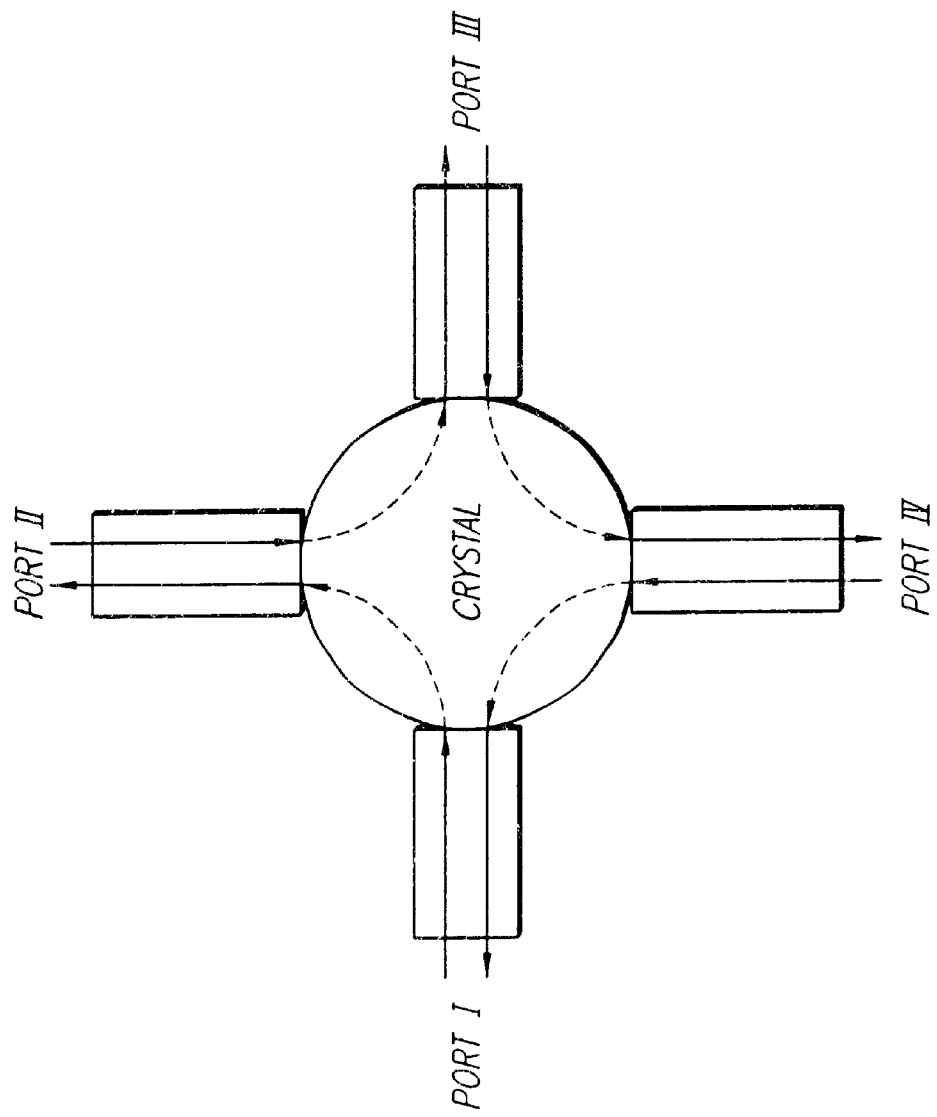
FIG. 3 schematically depicts an alternative embodiment of the direction guide of FIG. 1 having four ports.

FIG. 2 shows an optical direction guide means 300-A constructed according to the present invention. Suitable-optical direction-guide means in the form of optical circulators, can be obtained from a number of vendors, such as E-Tek, Dicon, Kaifa, and JDS. The optical direction guide means can comprise mechanisms such chasisolators, or polarized filters using polarization of light to determine direction. Additionally, a regular signal splitter can be employed, splitting the signal into two components, one associated with the transmitter and one associated with the receiver, can be employed. In any event, the direction guide means 300-A will have at least three ports, a input port 310-A, a output port 320-A and a bidirectional port 330-A. If an optical circulator is employed, each port can receive optical signal from another port and output that signal from the circulator, as well as inputting a signal into the circulator and sending that signal to another port, at same time. Stated differently, with optical circulators, all ports are potentially bidirectional. For example, viewing FIGS. 1 and 2, Port I (input port 310-A in FIG. 1) can send an optical DWDM signal (with wavelengths $\lambda_{11}, \lambda_{12}, \ldots, \lambda_{1M}$) to Port II (bidirectional port 330-A in FIG. 1) while optionally simultaneously receiving another optical DWDM signal (with wavelength $\lambda_{31}, \lambda_{32}, \ldots, \lambda_{3L}$ not shown in FIG. 1) from Port III. Similarly, Port II (bidirectional port 330-A in FIG. 1) can receive an optical DWDM signal (with wavelengths $\lambda_{11}, \lambda_{12}, \ldots, \lambda_{1M}$) from Port I while simultaneously transmitting another optical DWDM signal (with wavelengths $\lambda_{21}, \lambda_{22}, \ldots, \lambda_{2L}$) from the optical waveguide 400 to Port III (320-A in FIG. 1). An optical direction guide means with more than three ports, such as direction guide 300-C (FIG. 3) may also be employed in certain applications. A signal from any given port is transferred to the next port in a clockwise (or counterclockwise depending upon the application) direction, unless the use has mounted a suitable reflecting device in the unused port, in which case the signal is forwarded to the next port after the one with the reflection device.

Figure 4:
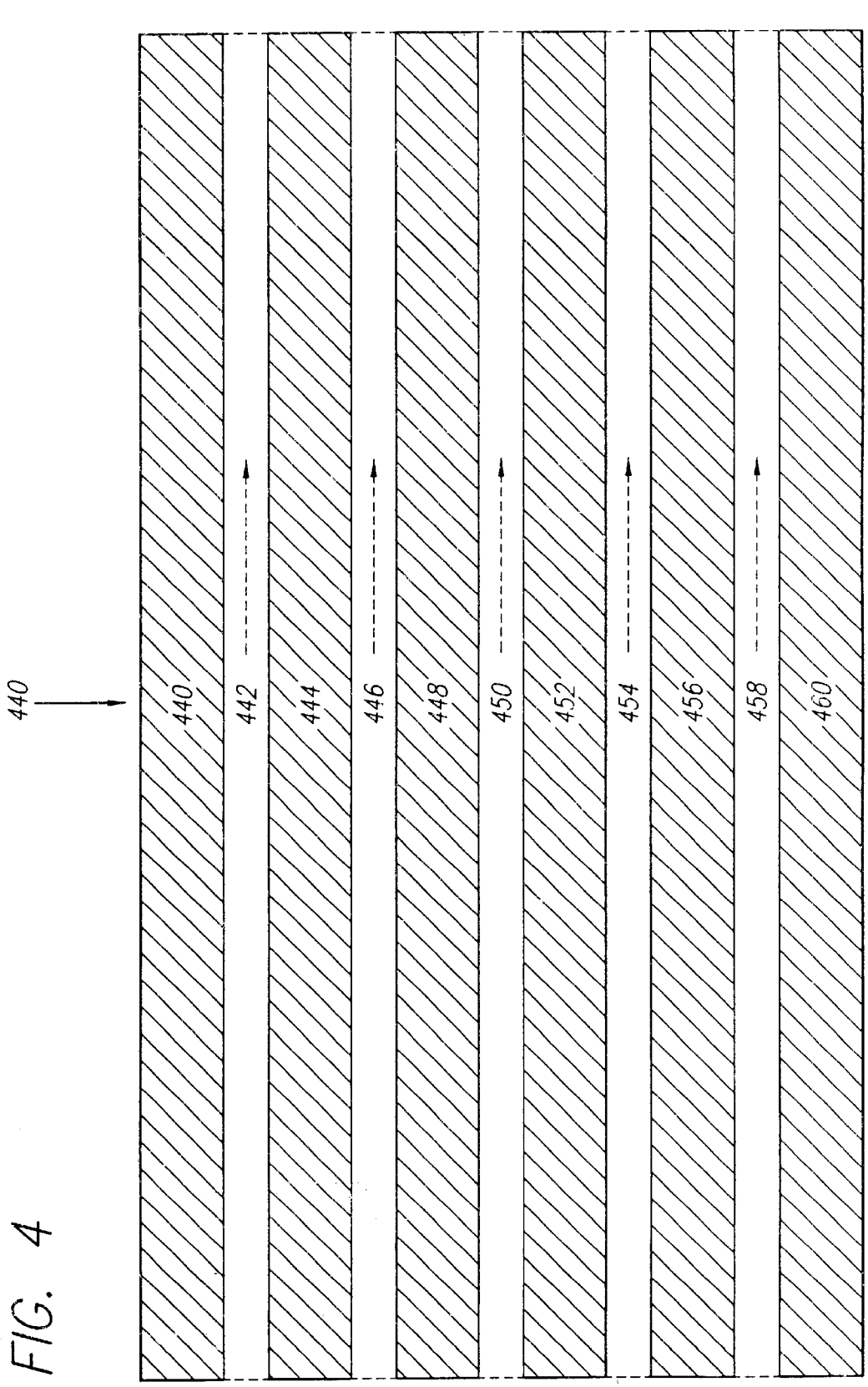
FIG. 4 shows the unidirectional manner information is transmitted over an optical waveguide by prior art systems.
Figure 5:
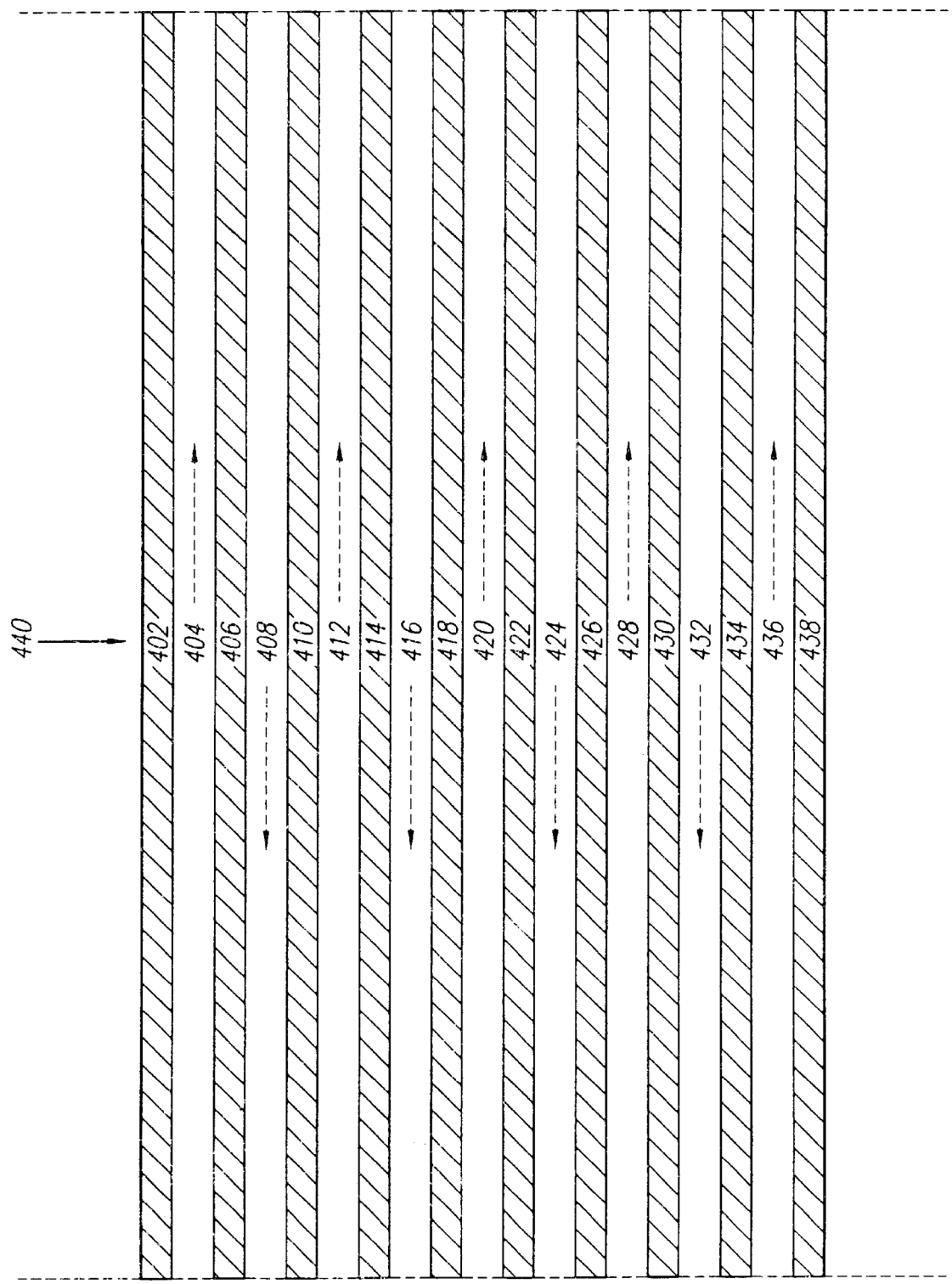
FIG. 5 shows the bidirectional manner information is transmitted over an optical waveguide by the present invention.

Viewing FIG. 4 along side FIG. 5, the manner in which the present invention makes more efficient use of scarce optical bandwidth can be seen. FIG. 4 shows the bandwidth allocation of a prior art unidirectional communications system. Signals (442, 446, 450, 454, and 458) travel only in one direction on the optical waveguide 400. To avoid such signals interfering with each other (cross talk, electrostatic interference, etc.), it is necessary to separate such signals by a wide guard space between channels, such as wide guard spaces 440, 444, 448, 452, 456, and 460. Typically, two signals (such as signals 442 and 446) must be separated by a wide guard space (such as wide guard space 444) to provide an effective channel spacing of at least 8 nm. Stated differently, signal 442 is spaced on both sides by wide guard spaces 440 and 444. The extreme waveband consumed by the wide guard spaces severely limits the number of signals that may be transmitted over a single optical waveguide 400.

In accordance with an important aspect of the present invention, adjacent signals traveling in opposite directions over an optical waveguide 400 produce significantly less cross talk and other electrostatic interference, reducing the need for the wide spacing shown in FIG. 4, and thus allowing more signals to be transmitted.

FIG. 5 shows how the bidirectional interleaved signal channels (signal channels 404, 412, 420, 428, and 436 travel in one direction, and signal channels 408, 416, 624 and 432 travel in the opposite direction) allow many more signal channels in a single optical waveguide 400 than allowed by the prior art. Interleaving signals traveling in opposite directions allows the use of narrow guard spaces (402, 406, 410, 414, 418, 422, 426, 430, 434, and 438) resulting in an effective channel spacing of approximately 0.4 nm, half the bandwidth of the prior art spacing shown in FIG. 4. This significant reduction in channel spacing is possible because prior to a given signal reaching a demultiplexer, such as DWDM demultiplexer 500-A (FIG. 1), adjacent signals traveling in the opposite direction have been "filtered" out, by the optical direction guide 300-B (FIG. 1) directing such opposite signals away from the DWDM demultiplexer 500-A and to the optical waveguide 400. Thus by the time the signals reach a DWDM demultiplexer a relatively wide spacing exists (the spacing used for opposite direction signals).

Having now described the invention in accordance with the requirements of the patent statutes, those skilled in the art will understand how to make changes and modifications in the present invention to meet their specific requirements or conditions. Such changes and modifications may be made without departing from the scope and spirit of the invention as set forth in the following claims.

What is claimed is:

1. A short distance bidirectional dense wavelength division multiplexing optical transmission system, for transmitting a first and a second plurality of unidirectional information-bearing signals over an optical waveguide having a first end and a second end without any amplification or regeneration, said system comprising:

a first transmitter for transmitting said first plurality of information-bearing signals from said first end to said second end in the form of a first combined modulated optical signal, and a second transmitter for transmitting said second plurality of information-bearing signals from said second end to said first end in the form of a second combined modulated optical signal, said transmitters each comprising
   a respective plurality of wavelength converters, each of said converters converting a different one of the respective plurality of information-bearing signals into a respective individual modulated optical signal centered about a different respective optical wavelength, each of said converters further comprising a laser, and
   a laser driver for directly modulating the output of the laser according to said resulting electronic signal, and
   a respective wavelength multiplexer coupled to said respective plurality of wavelength converters, for combining a respective plurality of said individual modulated optical signals into the respective said combined modulated optical signal, wherein each said wavelength multiplexer further comprises
   a respective auxiliary multiplexer module having
   a respective first plurality of ports for receiving individual modulated optical signals within a respective first predetermined group of wavelength ranges, and
   a respective first auxiliary port capable of outputting a respective first intermediate combined optical signal including all of said modulated optical signals within said respective first predetermined group of wavelength ranges,
   a respective primary multiplexer module having
   a respective second plurality of ports each capable of receiving a respective one said individual modulated optical signals within a respective second predetermined group of wavelength ranges outside of said respective first predetermined group of wavelength ranges,
   a respective second auxiliary port directly, coupled to said respective first auxiliary port and capable of receiving said respective first intermediate combined optical signal from said respective first auxiliary port, and
   a respective primary port capable of outputting the respective said combined modulated optical signal including both said respective first intermediate combined optical signal and all of said respective individual modulated optical signals within said respective second predetermined group of wavelength ranges;

a first receiver for receiving said first combined modulated optical signal at said second end, and a second receiver for receiving said second combined modulated optical signal at said first end, said receivers each comprising
   a respective wavelength demultiplexer for separating the respective said combined signal into a respective plurality of individual received modulated optical signals, wherein each said wavelength demultiplexer further comprises
   a respective first auxiliary demultiplexer module having
   a respective first plurality of output ports each capable of outputting a respective one of said individual modulated optical signals within a respective said first predetermined group of wavelength ranges, and
   a respective first auxiliary demultiplexer port capable of receiving a respective second intermediate combined optical signal including all of said modulated optical signals within said respective first predetermined group of wavelength ranges,
   a first primary demultiplexer module having
   a respective second plurality of output ports each capable of outputting a respective one of said individual modulated optical signals within a respective said second predetermined group of wavelength ranges outside of said respective first predetermined group of wavelength ranges,
   a respective second auxiliary demultiplexer port directly coupled to said first auxiliary demultiplexer port and capable of outputting a respective said second intermediate combined optical signal to said respective first auxiliary port, and
   a respective primary demultiplexer port capable of receiving the respective said combined modulated optical signal including both the respective said first intermediate combined optical signal and all of said individual modulated optical signals within the respective said second predetermined group of wavelength ranges; and
   a respective plurality of optical receivers, each responsive to a different one of said received individual modulated optical signals and converting that received optical signal back into its original form as a respective information-bearing signal; and a first directional guide means for optically coupling the first transmitter and the second receiver to the first end of the waveguide, and a second directional guide means for optically coupling the second transmitter and the first receiver to the second end of the waveguide, each of the optical directional guide means comprising an input port for receiving the respective said combined signal from the respective wavelength multiplexer before said respective combined signal has been transmitted over said waveguide, an output port for transmitting the other said combined signal to the other wavelength demultiplexer after said other combined signal has been transmitted over said waveguide, and a respective bidirectional port for transmitting the respective combined signal to the optical wave guide and for receiving the other combined signal from the optical waveguide;

wherein said first plurality of information-bearing signals are modulated, combined and transmitted from the first transmitter to the first receiver in a first direction and the second plurality of unidirectional signals are modulated, combined and transmitted from the second transmitter to the second receiver in a second direction, concurrently and bidirectionally over the same said optical waveguide, adjacent optical wavelengths of either of said combined signals are transmitted at a predetermined first channel spacing providing a predetermined minimal amount of cross talk between two adjacent channels regardless of the direction of transmission of the individual optical signals, whereby each said combined optical signal is compatible with wavelength multiplexers and wavelength demultiplexers that are designed for said predetermined first channel spacing between adjacent channels;

adjacent optical wavelengths transmitted over the optical waveguide-have a predetermined second channel spacing equal to half of said first predetermined channel spacing, whereby the maximum transmission capacity of said system with only one said waveguide is twice that possible with a waveguide having said predetermined first channel spacing between adjacent channels;

adjacent channels of said optical waveguide are not used for transmission in a same said direction;

when being transmitted over said waveguide, at least some of the first individual wavelengths of said first combined signal. are interleaved with the second individual wavelengths of said second combined signal; and said first and second plurality of individual modulated signals are modulated, combined and transmitted, without regard to data rate or format.

2. The bidirectional optical transmission system of claim 1 wherein, when being transmitted over said waveguide, substantially all of the first individual wavelengths of said first combined signal are interleaved with the second individual wavelengths of Said second combined signal.

3. The bidirectional optical transmission system of claim 1 wherein said optical directional guide means are optical circulators that guide essentially all of each said combined signal to a respective intended destination port.

4. The bidirectional optical transmission system of claim 1 wherein said optical directional guide means are circulators that guide essentially all of each said combined signal to a respective intended destination port.

5. The bidirectional optical transmission system of claim 1 wherein each said predetermined spacing is measured from the nominal center of one channel to the nominal center of an adjacent channel.

6. The bidirectional optical transmission system of claim 5 wherein said first predetermined spacing is 0.8 nm and said second predetermined spacing is 0.4 nm.

* * * * *